United States Patent

Dupnock et al.

[15] 3,676,775

[45] July 11, 1972

[54] METHOD FOR MEASURING RESISTIVITY

[72] Inventors: Andrew Dupnock, Fishkill; Edward F. Gorey, Beacon; William A. Keenan, Poughkeepsie, all of N.Y.

[73] Assignee: International Business Machines Corporation, Armonk, N.Y.

[22] Filed: May 7, 1971

[21] Appl. No.: 141,307

[52] U.S. Cl. ....................324/64

[51] Int. Cl. ....................G01r 27/14

[58] Field of Search ....................324/64, 158 R, 158 D, 158 P

[56] References Cited

UNITED STATES PATENTS 3,609,537 9/1971 Healy et al....................324/64

OTHER PUBLICATIONS

Clerx, " Mechanical Aspects of Testing Resistivity of Semiconductor Materials and Diffused Layers," Solid State Technology, June 1969, pp. 6, 69 & 70.

*Primary Examiner*—Stanley T. Krawczewicz
*Attorney*—Hanifin and Jancin

[57] ABSTRACT

The method for measuring the bulk resistivity of an epitaxial semiconductor layer on a monocrystalline semiconductor base with a 4-point probe apparatus wherein the base has at least two high conductivity diffused regions, positioning two current probes directly over two separate diffused regions in contact with the surface of the epitaxial layer, placing two spaced voltage probes in contact with the epitaxial layer in a generally intermediate position relative to the current probes, inducing a current through the current probes and measuring the voltage drop between the voltage probes, calculating the bulk resistivity in accordance with the expression:

$$\rho = \frac{\text{voltage} \times \text{correction factor} \times \text{thickness of the layer}}{\text{CURRENT}}.$$

6 Claims, 2 Drawing Figures

INVENTORS
ANDREW DUPNOCK
EDWARD F. GOREY
WILLIAM A. KEENAN
BY Wolmar J. Stoffel
ATTORNEY

METHOD FOR MEASURING RESISTIVITY

BACKGROUND OF THE INVENTION

1. Field of the Invention

This invention relates to methods of testing semiconductor devices, more particularly to methods for testing an epitaxial layer on a monocrystalline semiconductor wafer during fabrication of the devices.

2. Description of the Prior Art

As the semiconductor technology advances, semiconductor integrated circuit devices become more and more miniaturized to increase performance, reduce size and cost. In fabricating semiconductor integrated devices it is a very common practice to form an epitaxial layer of the semiconductor material on the surface of a monocrystalline semiconductor wafer. Normally diffusions are made in the wafer to form high conductivity regions which reduce the collector resistance. These regions are then covered with the epitaxial layer. In forming transistors diffusions are then made from the surface of the layer to form the base and emitter regions. As the devices become more miniaturized control over the process parameters in fabricating the devices becomes more critical. For example, PN junctions are more closely spaced requiring more precise control of the diffusion operations.

An important area of control is maintaining the design specified impurity concentration in the epitaxial layers. The impurity concentration in the epitaxial layer has a direct influence on the resistivity of the collector regions. Collector resistance must be very carefully controlled in order to maintain a uniformity of operation of the devices. Further, the impurity concentration in the epitaxial layer has an influence on the depth of the surface diffusions, particularly the base region diffusion. For example, a greater impurity concentration in the epitaxial layer can impede the diffusion of the opposite type impurity used to form the base. For a given diffusion time, the base regions in different wafers having different epitaxial layer impurity concentrations will have different depths. Variation in base depth and collector impurity concentration will also have a marked effect on the breakdown voltage of the devices. Thus, as the device geometry gets smaller maintaining the resistivity within prescribed limits becomes more critical due to the present variability in deposition apparatus and techniques. A technique to measure the resistivity of an epitaxial layer directly on the device wafter is highly advantageous. The test should be accurate, simple, and easy to make.

The most common method of checking or measuring the resistivity of a deposited epitaxial layer known to the art is the use of a control wafer technique. In this technique one or more blank wafers are loaded into the wafer holding apparatus along with the wafers to be processed into integrated circuit devices, and the apparatus is inserted into the deposition tube. Following the removal of the wafers, the control wafers are used exclusively for testing purposes on the assumption that the deposited epitaxial layer is typical of the other wafers. The thickness of the epitaxial layer is measured and the resistivity of the layer measured using a 4-point probe. The 4-point probe apparatus is well known in the art and is discussed in detail in Dobbs, P.J.H. and F. S. Kovacs: *Semiconductor Products* "Solid State Technology," 7(8):28 (1964). Very briefly the 4-point probe has four probes, two of which are current probes which introduce a current into the material being tested and the voltage drop across a portion of the material being detected and measured by two-spaced voltage probes. The resistivity measurement using the 4-point probe technique was not generally used on wafers containing varied diffused regions because the diffused regions introduced an unpredictable variability into the technique depending on the location of the diffusions relative to the probes.

SUMMARY OF THE INVENTION

An object of this invention is to provide an improved technique for measuring the bulk resistivity of an epitaxial layer of semiconductor material.

Another object of this invention is to provide a method for directly measuring the resistivity of an epitaxial layer overlying a plurality of individual high conductivity regions.

Another object of this invention is to provide a method for measuring a resistivity of integrated circuit devices during fabrication.

Another object of this invention is to use a high concentration diffusion below the surface of a semiconductor for the purpose of introducing current into the semiconductor.

In this method for measuring resistivity of an epitaxial semiconductor layer at least two-spaced high conductivity diffused regions are formed in a base wafer prior to deposition of the epitaxial layer. A 4-point probe is used wherein at least the current probes are located directly over the high conductivity regions and a current caused to flow in the layer. The voltage drop between two spaced probes in proximity to the current probes is measured and resistivity calculated as a function of the voltage drop, the current, thickness of the layer, probe spacing, and the percent of the substrate containing diffusions.

BRIEF DESCRIPTION OF THE DRAWINGS

The foregoing and other objects, features and advantages of the invention will be apparent from the following more particular description of preferred embodiments of the invention as illustrated in the accompanying drawings.

DESCRIPTION OF PREFERRED EMBODIMENTS

Figure 1:
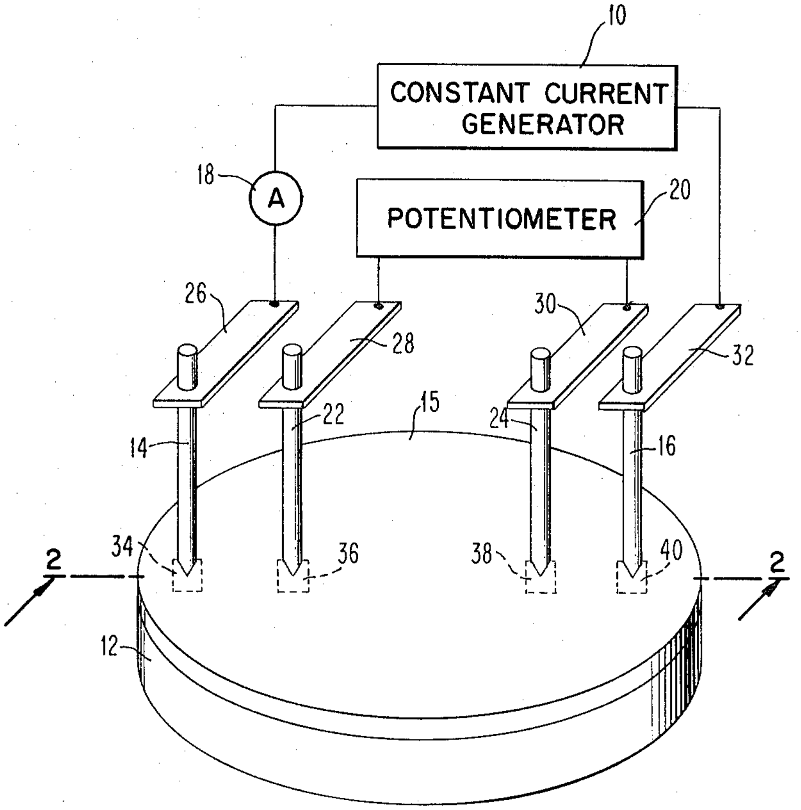
FIG. 1 is a view in perspective illustrating schematically the relationship of a 4-point probe to a wafter using the process of the invention.

Referring now to the drawings, there is depicted in FIG. 1 the arrangement of the 4-point resistance probe and a semiconductor wafer which illustrates the method of the invention. In the 4-point probe technique a current is introduced into the semiconductor or other material through two-spaced current probes, and the voltage drop across a portion of the wafer between the current probes is measured by two-spaced voltage probes. In FIG. 1 a constant current generator 10 introduces a current flow in epitaxial layer 15 of wafer 12 through current probe 14 and 16. Ammeter 18 is used to measure the current and serve as a check to assure that it remains constant. A potentimeter 20 measures the voltage drop in the semiconductor wafer 12 through voltage probes 22 and 24. The material selected for the current and voltage probes should primarily exhibit excellent electrical conductance and secondary have high resistance against wear. Various types of materials are used as, for example, tungsten carbide, various steel alloys, and tungsten. Additionally the probe tips can be plated with a suitable material such as Osmium to decrease the contact resistance. In order to produce consistant results, it is desirable that the loading of the probes remain constant while the measurements are taken, and from wafer to wafer. This load is normally expressed in grams per probe pin. The commonly used term "probe pressure" means basically the specific load or load per unit area of contact. This is usually expressed in grams per inch$^2$ or grams per mm.$^2$. In general probe pressure varies from 45 to 180 grams per pin. The loading is maintained by springs 26, 28, 30, and 32 which support the probes in the proper spacing.

The measuring of the resistivity of an epitaxial layer 15 supported on a semiconductor wafer 12 introduces problems not encountered when measuring the bulk resistivity of a wafer or other solid semiconductor object. A semiconductor wafer used in the fabrication of integrated circuit devices normally contains a large number of buried diffused regions of opposite impurity located at the interface of the epitaxial layer and the wafer. Significant variation in both the current flow paths between the current probes resulting in different current densities at different locations and also voltage measurements made by the voltage probes will result from successive measurements when there is a variation of the probe position relative to underlying diffused regions. Because of this inherent variation, it is conventional to determine the resistivity of an epitaxial layer during fabrication of integrated circuit devices by including a number of control wafers with the semiconductor wafers on which the devices are to be fabricated. The test wafers are subsequently tested on known apparatus to determine the nature of the deposited epitaxial layer on the associated wafers. The assumption is made that the deposited epitaxial layer will have the same resistivity as the resistivity on the associated device wafers because both layers were deposited at the same time within the same reactor.

Figure 2:
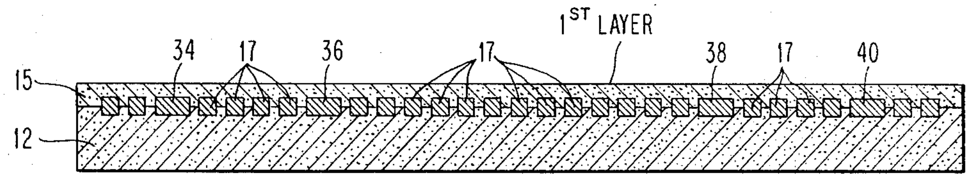
FIG. 2 is an elevational view in cross-section illustrating the various tests sites in a typical semiconductor wafer.

In this method buried diffused regions 34, 36, 38, and 40 are provided in wafer 12. The respective current and voltage probes are then located directly over the diffused region and the readings made in the conventional manner. The method is particularly suited to manufacturing of integrated circuit devices where a consistant subcollector diffusion pattern is utilized. The diffused regions assume a uniform consistent spacing and are related in the same manner to adjacent diffused regions which ultimately become a part of integrated circuit devices when the wafer is ultimately severed. The diffused regions under the probes then become the critical spacing factor. Minor space variations of the probes become insignificant as long as the probes are located generally over the diffused regions. The relationship of the test sites 34, 36, 38, and 40 is more clearly shown in FIG. 2 wherein adjacent buried diffused regions 17 are illustrated. Test sites 34, 36, 38, and 40 can also be utilized to measure the thickness of the epitaxial layer by conventional optical techniques.

By providing the test site pattern in the semiconductor wafers, each wafer can be individually tested if desired. Use of the pattern and associated techniques eliminates the necessity of including additional test wafers as is common in the prior art which occupy space within the epitaxial reactor. This space using this method can now be used to produce useful integrated circuit devices. In addition, the technique is capable of providing a more accurate measurement of the resistivity of the deposited epitaxial layer.

A correction factor must be used to calculate the epitaxial layer resistivity from the thickness of the epi layer and the resitance ($R=V/I$) measured with this technique. All 4-point probes have such correction factors that depend on the probe spacing and geometry of the layer measured. The high concentration diffusions below the epi layer (at the epi-substrate interface) play an important role in this measurement technique. The large chip size diffusions 34, 36, 38, and 40 over which the current probes are placed act as sinks for the current from these probes and act as current sources for the rest of the epi layer. Hence, these large diffusions determine the "probe spacing" in that they determine the distance between the current sources. The device diffusions along the current path between the sources contribute resistivity in series with the epi resistivity.

The correction factor for the probe described here will therefore depend on the separation between the two current-source diffusions and on the percent of the substrate area occupied by these and the device diffusions. The correction factor will be different for different diffusions topographies, but will be the same for any one product. To determine the correction factor for any one type product wafer the voltage is measured and divided by the current, $$R = V/I.$$

This resistance is then multiplied by the thickness, $t$ of the layer. This uncorrected resistivity is then divided into the resistivity, $\rho C$ determined by making a standard sheet resistance measurement on a control wafer processed in the same epitaxial deposition. The conventional sheet resistance technique can be used because the control wafer has no diffusions at the substrate epitaxial layer interface. Thus $$\text{CORRECTION FACTOR} = \frac{\rho_c}{\frac{V}{I}t},$$

and this correction factor can be used on any product wafers with the same diffusion layout on the substrate wafer. In routinely performing this measurement the voltage and current are measured at the respective probes, the epitaxial layer thickness is measured and the resistivity of the layer is calculated $$\rho = V/I \times t \times \text{CORRECTION FACTOR}.$$

The validity of the above technique for determining the correction factor was checked on 25 wafers of the same diffusion type. The calculated average correction factor was 2.933 with a range of 0.218 and a standard deviation of 0.0586 or 2.0 percent. The reproducibility of this technique for measuring sheet resistance on device wafers was checked by repeating the measurement on 40 different days on three different wafers. In all three cases the percent range (range mean) was less than 1.0 percent and the percent standard deviation was less than 0.25 percent. No other technique for measuring epi resistivity is this reproducible.

The advances presented by this technique are:

1. This is the only technique for measuring epitaxial sheet resistance directly on device wafers with buried diffusions.

2. One sheet resistance reading by this technique gives the average sheet resistance for the whole layer because the probes span across the whole layer.

3. This measurement of sheet resistance is more reproducible than other techniques.

4. The effective spacing of the current probes is built into the wafer by the large diffusions over which the current probes are placed, the actual location of the probes over the diffusion does not effect the measurement in any way because the current from the probes short to the diffusions regardless of their location over the diffusions.

5. The large (compared to conventional sheet resistance probes) spacing of the voltage probes makes the measurement much less sensitive to probe wander because the error introduced by probe wander $\Delta S$ is inversely proportional to the probe spacing $$\text{ERROR} = \Delta S/S.$$

The shorting effect of the large diffused area under the current probes and their role as current sources for the epitaxial layer is the key to the success of this process. This process will work on epitaxial layers of any thickness so long as the smallest dimension of the current probe diffusion is larger than the epi thickness. If an area of one chip is devoted to these current probe diffusions, this technique will always work. The diffused regions beneath the probes can be of any suitable area. Preferably the area is sufficiently large so that the probes can be conveniently located over the regions without the possibility of misalignment. Most preferably each diffused region occupies the same space as one integrated circuit chip on the wafer. The linear dimensions of one chip are normally of the order of 50 mils or about 1,250 $\mu m$. The technique thus works for epi thickness up to 1,000 $\mu m$ or 40 mils. The preferred epi thickness range is from 0.5 to 20 $\mu m$. The regions beneath the voltage probes are spaced at least the distance of one chip, preferably in the range of 25 to 500 mils. The regions beneath the current probes are spaced a distance greater than the voltage probe regions, preferably at least the width of one integrated circuit chips from the region beneath the voltage probes.

Another important advantage to the measurement of resistivity directly on device wafers is that the resistivity is often different on the control wafers. Because of the high density of high concentration diffusions on the device wafers at the epitaxial layer and substrate interface the resistivity of the epitaxial layer on the device wafers is often much lower than on the control wafers because of out-diffusions and autodoping due to these diffusions. The resistivity determined on the control wafer is therefore inaccurate.

While the invention has been particularly shown and described with reference to preferred embodiments thereof, it will be understood by those skilled in the art that the foregoing and other changes in form and details may be made therein without departing from the spirit or the scope of the invention.

What is claimed is:

1. A method of measuring the bulk resistivity of an epitaxial semiconductor layer on a monocrystalline semiconductor base with a 4-point probe apparatus comprising, forming at least two-spaced high conductivity diffused regions in the base, depositing an epitaxial layer of semiconductor material on the base, positioning two current probes directly over said diffused regions in contact with the surface of said epitaxial layer, placing two-spaced voltage probes in contact with the surface of said epitaxial layer in generally intermediate positions relative said current probes, introducing through said current probes an electrical current flow through the epitaxial layer between the probes, measuring the voltage drop in the epitaxial layer across said voltage probes, calculating the bulk resistivity in accordance with the expression:

$$\text{Resistivity} = V/I \times C.F. \times t,$$

where $V$ is the voltage drop, $I$ is the current flow, $t$ is the epitaxial layer thickness, and d$C.F.$ is an empirical correction factor that is a function of the voltage probe spacing and the percent area of the substrate covered by the diffused regions.

2. The method of claim 1 wherein said voltage probes are placed over two separate sub-surface high conductivity diffused regions in said base.

3. The method of claim 2 wherein said base and overlying semiconductor layer includes a plurality of subsurface high conductivity diffused regions intermediate said diffused regions beneath the current and voltage probes.

4. The method of claim 3 wherein said diffused regions under said voltage and current probes are tests sites on a wafer at an intermediate stage in the fabrication of integrated circuit devices.

5. The method of claim 1 wherein said thickness of the epitaxial layer is in the range of 0.2 to 15 microns.

6. The method of claim 1 wherein said semiconductor material is silicon.

* * * * *